Dec. 15, 1970     R. D. BURNS     3,548,311
DOWNED-AT-SEA AIRCRAFT RADIO LOCATION TRANSMITTER
Filed Aug. 1, 1967
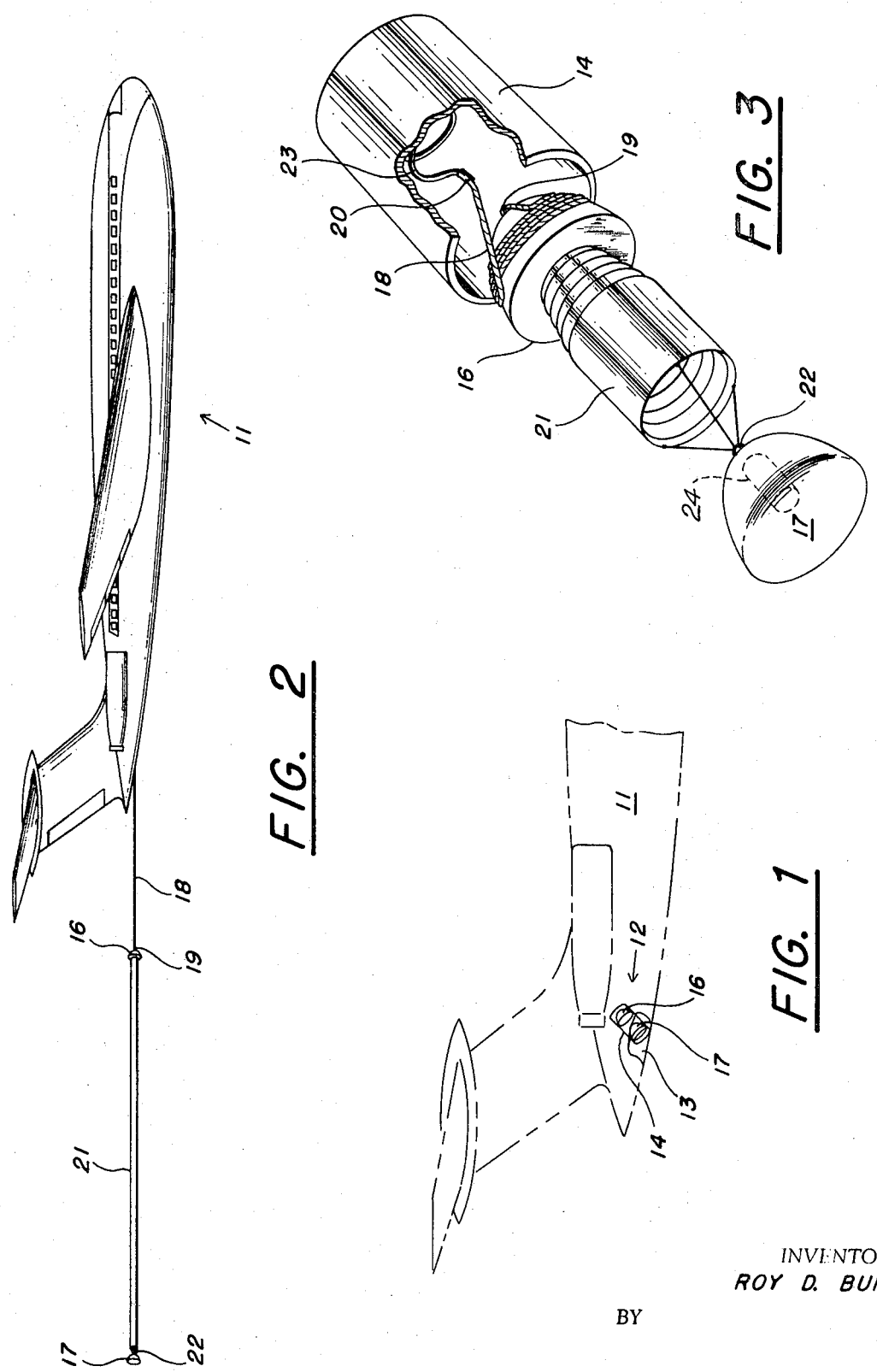
INVENTOR.
ROY D. BURNS
BY
Richard K. MacNeill

United States Patent Office 3,548,311
Patented Dec. 15, 1970

3,548,311
DOWNED-AT-SEA AIRCRAFT RADIO
LOCATION TRANSMITTER
Roy D. Burns, 709 Daisy, Escondido, Calif. 92025
Filed Aug. 1, 1967, Ser. No. 657,584
Int. Cl. H04b 1/02
U.S. Cl. 325—115      3 Claims

ABSTRACT OF THE DISCLOSURE

An aircraft location device for transmitting a distress signal which consists of first and second cones connected by a long metallic cable with the front cone tied to the rear section of an aircraft for dragging the entire assembly while in flight, the rear cone housing a transmitter coupled to the dragline for transmitting a distress signal and having means for decoupling underwater to allow the entire assembly to surface for location of a downed aircraft.

BACKGROUND OF THE INVENTION

The present invention relates to an aircraft locating device and more particularly to an aircraft locating device which is releaseable to drag behind an aircraft for maximum range distress signal propagation and release for continued operation in an aqueous medium.

According to the invention, a pair of cones are coupled by a dragline which is preferably constructed of a metallic cloth, one of said cones being coupled by a tow line to the rear section of an aircraft. When being dragged behind the aircraft, the cones are oriented with their apexes pointing toward the aircraft for a minimum of drag and wobble on the aircraft. A transmitter is preferably mounted in the rear cone having an output coupled to the metallic cloth dragline for energization as an antenna. The entire assembly can be neatly mounted and carried within a cylinder which in turn is mounted in a compartment in the rear section of the aircraft fuselage. Upon activation, a surface door would automatically be released allowing the two cones to pay out behind the aircraft. A soak-away joint is provided should the aircraft go down in water for releasing the entire assembly to float to the surface and continue to transmit a distress signal to indicate the location of the crash.

An object of the present invention is the provision of an aircraft location device which is conveniently stored in the rear section of an aircraft for release behind the aircraft.

Another object is the provision of an aircraft location device for towing behind an aircraft which exerts a minimum of drag and wobble during operation.

A further object of the invention is to provide an aircraft location device which continues to operate should the aircraft go down in an aqueous medium.

Yet another object of the invention is the provision of an aircraft location device which is simple and inexpensive to manufacture and install, and requires a minimum of maintainance and is extremely reliable in operation.

Other objects and many of the attendant advantages will be readily appreciated as the same becomes better understood by reference to the following detailed description when considered in connection with the accompanying drawing in which like reference numerals designate like parts throughout the figures thereof and wherein:

FIG. 1 is a schematic view of the tail section of an airplane showing the storage location of the present invention;

FIG. 2 is a schematic representation of an aircraft in flight with the present invention in use; and FIG. 3 is an exploded view in perspective of the preferred embodiment of the present invention.

Referring to FIG. 1, aircraft is shown generally at 11 having a compartment 12 with a surface door 13. Cylinder 14 is stored within the compartment 12 and contains forward cone 16 and rear cone 17.

Referring to FIG. 2, aircraft 11 is shown having a tow line 18 attached to the apex 19 of front cone 16. Metallic dragline 21 is coupled between front cone 16 and apex 22 of rear cone 17.

Referring to FIG. 3, cylinder 14 has a coil spring 23 attached at one end thereof, the end of which is attached to tow line 18. Tow line 18 is shown coiled around the front cone 16 and attached at its apex 19. Dragline 21 is also attached to apex 19 of front cone 16 at one end and to apex 22 or rear cone 17 at another end.

OPERATION

Referring now to all of the figures it can be seen that during storage the entire unit with dragline 21 is coiled and mounted compactly within cylinder 14 which is stored in compartment 12 of the rear section of aircraft 11. A surface door 13 secures the entire unit during storage. When actuated (this can be accomplished electrically by an electric release on surface door 13 either manually or on impact) surface door 13 opens allowing the entire assembly to fall out of the aircraft with the dragline 21 and tow line 18 paying out as shown in FIGS. 2 and 3. Coil spring 23 cushions the impact of the unit as tow line 18 and dragline 21 reach their fully-extended position as shown in FIG. 2. At this point, a portable transmitter located within rear cone 17 begins operating, exciting the metallic component of dragline 21 and transmitting a predetermined distress signal. The utilization of cones 16 and 17 for the mounting of a portable transmitter and the antenna (dragline 21) results in an extremely stable towed antenna. It is also contemplated that dragline 21 will be constructed of a light reflective material for visual sighting as well as radio direction finder homing device. A metallic soak-away joint 20 is utilized for coupling tow line 18 to coil spring 20 to allow the entire unit to float to the surface should the aircraft go down at sea or in any aqueous medium which will facilitate the easy location of the crash. In this regard, airpockets can be built into the front and rear cones 16 and 17 to insure a positive buoyancy of the entire unit. Rear cone 17 is preferably lined with a shock-absorbing material such as polistirene foam to lessen any impact on the portable transmitter mounted therein.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

What is claimed is:
1. An aircraft locating device comprising:
   first and second cones;
   an electrically conductive dragline physically coupling said first and second cones together;
   one of said first and second cones housing a radio transmitter;
   said transmitter having an output coupled to said electrically conductive dragline;
   a towline coupled between the apex of one of said first and second cones and an aircraft to be located; and
   a soak-away section in said towline for decoupling said aircraft from said first and second cones and said electrically conductive dragline when said soak-away section is immersed in an aqueous medium.
2. The aircraft locating device of claim 1 and further including a storage compartment in the fuselage of said aircraft to be located for storing said first and second cones, said electrically conductive dragline and said towline.

3. The aircraft locating device of claim 1 and further including a coil spring means coupling said towline to said aircraft to be located.

References Cited

UNITED STATES PATENTS

| 2,928,935 | 3/1960 | Murray | 325—114 |
|---|---|---|---|
| 2,187,575 | 1/1940 | Schröder | 343—707X |
| 2,287,257 | 6/1942 | Lear | 343—707X |
| 2,417,191 | 3/1947 | Fox | 325—115 |
| 2,448,587 | 9/1948 | Green | 325—115X |
| 2,511,363 | 6/1950 | Mitchell | 343—707X |
| 2,629,083 | 2/1953 | Mason et al. | 343—705X |
| 2,795,778 | 6/1957 | Bagby | 325—115X |
| 3,004,735 | 10/1961 | Kinard | 325—115X |
| 3,251,565 | 5/1966 | Haist | 343—707X |
| 3,335,371 | 8/1967 | Yandell | 325—115 |

ROBERT L. GRIFFIN, Primary Examiner

B. V. SAFOUREK, Assistant Examiner

U.S. Cl. X.R.

325—114; 343—705